(12) United States Patent
Manapragada et al.

(10) Patent No.: US 10,095,558 B2
(45) Date of Patent: Oct. 9, 2018

(54) SYSTEMS AND METHODS FOR OFFLOADING INLINE SSL PROCESSING TO AN EMBEDDED NETWORKING DEVICE

(71) Applicant: CAVIUM, INC., San Jose, CA (US)

(72) Inventors: Ram Kumar Manapragada, Hyderabad (IN); Manojkumar Panicker, Sunnyvale, CA (US); Faisal Masood, San Jose, CA (US); Satish Kikkeri, San Jose, CA (US)

(73) Assignee: CAVIUM, INC., San Jose, CA (US)

( * ) Notice: Subject to any disclaimer, the term of this patent is extended or adjusted under 35 U.S.C. 154(b) by 324 days.

(21) Appl. No.: 15/152,164

(22) Filed: May 11, 2016

(65) Prior Publication Data

US 2016/0352870 A1    Dec. 1, 2016

Related U.S. Application Data

(60) Provisional application No. 62/166,613, filed on May 26, 2015.

(51) Int. Cl.
| | |
|---|---|
| *G06F 15/16* | (2006.01) |
| *G06F 9/54* | (2006.01) |
| *G06F 13/42* | (2006.01) |
| *H04L 29/06* | (2006.01) |
| *H04L 29/08* | (2006.01) |

(52) U.S. Cl.
CPC ............ *G06F 9/54* (2013.01); *G06F 13/4282* (2013.01); *H04L 63/168* (2013.01); *H04L 67/34* (2013.01)

(58) Field of Classification Search
None
See application file for complete search history.

(56) References Cited

U.S. PATENT DOCUMENTS

2005/0251856 A1 * 11/2005 Araujo .................. H04L 63/123
                                                                726/12
2016/0277478 A1 *  9/2016 Narasimhamurthy ......................
                                                           H04L 69/162

* cited by examiner

*Primary Examiner* — Brian Whipple
(74) *Attorney, Agent, or Firm* — Duane Morris LLP; David T. Xue (57) ABSTRACT

A new approach is proposed that contemplates systems and methods to support a mechanism to offload all aspects of inline SSL processing of an application running on a server/host to an embedded networking device such as a Network Interface Card (NIC), which serves as a hardware accelerator for all applications running on the server that need to have a secure connection with a remote client device over a network. By utilizing a plurality of its software and hardware features, the embedded networking device is configured to process all SSL operations of the secure connection inline, i.e., the SSL operations are performed as packets are transferred between the host and the client over the network, rather than having the SSL operations offloaded to the NIC, which then returns the packets to the host (or the remote client device) before they can be transmitted to the remote client device (or to the host).

24 Claims, 5 Drawing Sheets

SYSTEMS AND METHODS FOR OFFLOADING INLINE SSL PROCESSING TO AN EMBEDDED NETWORKING DEVICE

CROSS-REFERENCE TO RELATED APPLICATIONS

This application claims the benefit of U.S. Provisional Patent Application No. 62/166,613, filed May 26, 2015, and entitled "SYSTEM AND METHOD TO OFFLOAD INLINE SSL PROCESSING TO A NETWORK INTERFACE CARD," which is incorporated herein in its entirety by reference.

BACKGROUND

It is commonplace for web services running on servers to secure connections to client devices over a network. This is typically done by running a Secure Sockets Layer (SSL) stack on a server to establish a secured TCP/IP connection over the network. Popular SSL solutions such as OpenSSL can provide a complete suite of security-related operations including but not limited to, connection establishment and tear down, and payload encryption and authentication, using software solutions. Providing security SSL operations and services in software, however, consumes tremendous amount of CPU processing power on the server.

In some OpenSSL and other SSL implementations, mechanisms are provided for offloading cryptography operations required by the secured connections from the server to an external hardware accelerator. Such mechanisms, however, primarily account for only cryptography operations (e.g., encryption/decryption, authentication) and have not been regarded as beneficial because they require multiple trips between user space of the server and the accelerator across, for example, a Peripheral Component Interconnect (PCI) bus. The CPU savings on the server would be greater if it is possible to offload the entire secure connection processing to a hardware accelerator.

The foregoing examples of the related art and limitations related therewith are intended to be illustrative and not exclusive. Other limitations of the related art will become apparent upon a reading of the specification and a study of the drawings.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

The following disclosure provides many different embodiments, or examples, for implementing different features of the subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

A new approach is proposed that contemplates systems and methods to support a mechanism to offload all aspects of inline SSL processing of an application running on a server/host to an embedded networking device such as a Network Interface Card (NIC), which serves as a hardware accelerator for all applications running on the server that need to have a secure connection with a remote client device over a network. By utilizing a plurality of its software and hardware features, the embedded networking device is configured to process all SSL operations of the secure connection inline, i.e., the SSL operations are performed as packets are transferred between the host and the client over the network, rather than having the SSL operations offloaded to the device, which then returns the packets to the host (or the remote client device) before they can be transmitted to the remote client device over the network (or to the application on the host). The embedded networking device, in effect, acts as a proxy on behalf of applications running on the server and perform the SSL operations (e.g., handshake and record processing) for the connection established with the remote client device on behalf of the hosted applications.

By enabling inline SSL processing via the embedded networking device, the proposed approach avoids multiple traversal of the PCI bus between the host and the hardware accelerator for offloaded security-related operations on network traffic. In addition, since SSL runs on top of a TCP/IP stack, the proposed approach that intends to offload the entire SSL processing to the hardware accelerator also provides the ability to terminate the TCP/IP connection on the hardware accelerator when needed.

Additionally, with a compatible socket layer on the server interfaces to interact with the accelerator as discussed in details below, the interface between the application running on the server/host and the hardware accelerator conforms to any existing interfaces so that the applications can benefit from the SSL offload capabilities of the hardware accelerator with little or no change to its software. Furthermore, since the hardware accelerator is acting as the network interface for all SSL traffic between the host and client device over the network, it is capable of handling non-SSL traffic as well. For a non-limiting example, the hardware accelerator is configured to identify connections that require SSL processing and handle them accordingly but to forward all standard (non-SSL) network traffic without additional SSL processing.

As referred to hereinafter, the embedded networking device(or hardware accelerator) is an NIC, which often includes a multi-core network packet processing engine to support flexible packet processing at various I/O rates (e.g., 10, 25, and 40 Gbps). Although NIC is used as a non-limiting example in the following discussions, a person ordinarily skilled in the art would have understood that the same approach can also be applied to other types of embedded networking devices.

Figure 1:
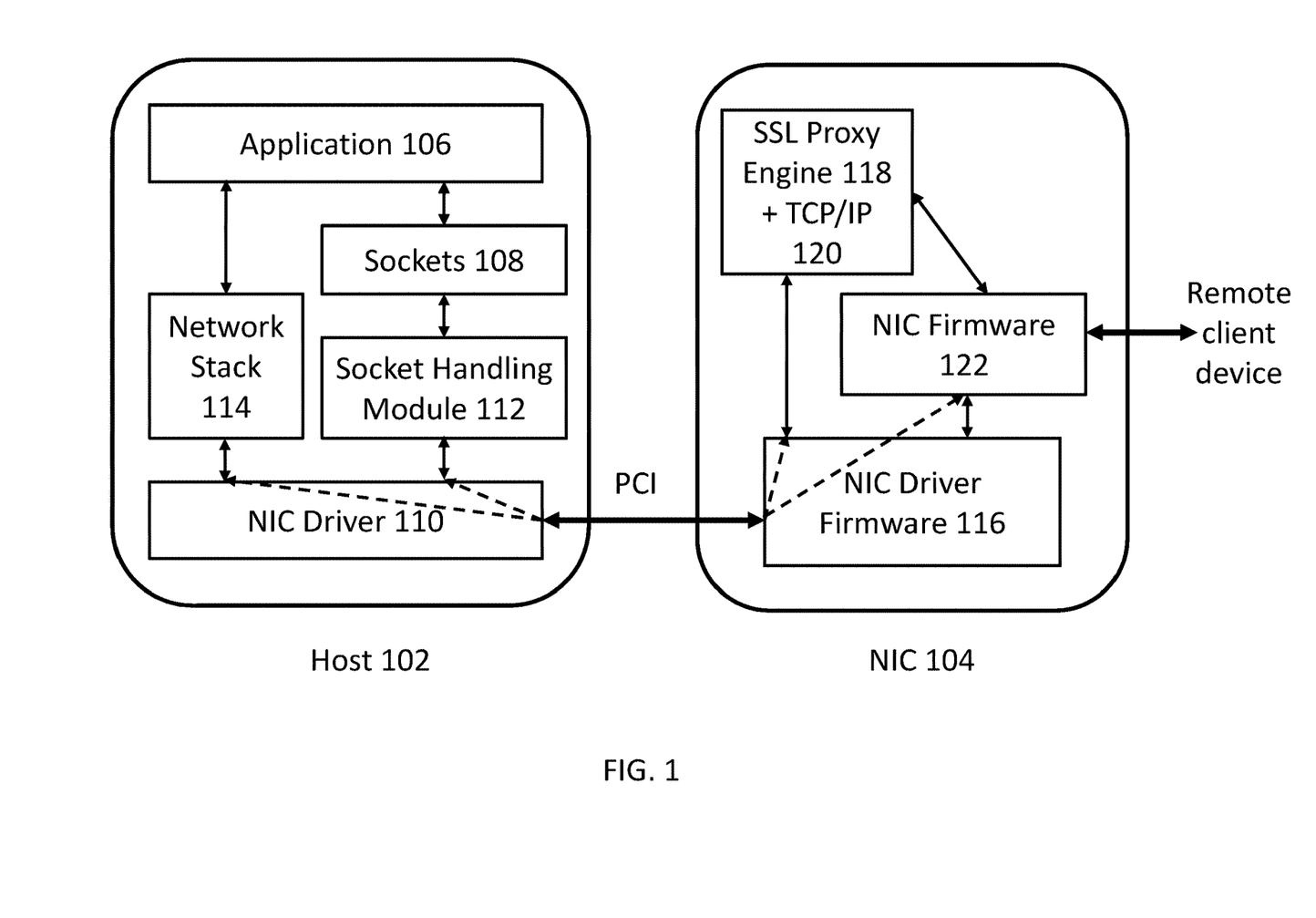
FIG. 1 depicts an example of a diagram of a system configured to support offloading of inline SSL processing in accordance with some embodiments.

FIG. 1 depicts an example of a diagram of a system 100 configured to support offloading of inline SSL processing. Although the diagrams depict components as functionally separate, such depiction is merely for illustrative purposes. It will be apparent that the components portrayed in this figure can be arbitrarily combined or divided into separate software, firmware and/or hardware components. Furthermore, it will also be apparent that such components, regardless of how they are combined or divided, can execute on the same host or multiple hosts, and wherein the multiple hosts can be connected by one or more networks.

In the example of FIG. 1, the system 100 includes a server/host 102 and a hardware-based, software-programmable NIC 104. Here, the host 102 can be but is not limited to an x86, OCTEON, or ARM based device/system/server. the NIC 104 can be a multi-core embedded hardware module/process engine or a single System-on-Chip (SoC) chip comprising one or more of coprocessors (not shown), a memory (also referred to as primary memory, not shown) such as RAM, and a storage unit (not shown) such as a non-volatile memory (also referred to as secondary memory) with software instructions stored in for practicing one or more processes. As shown by the example of FIG. 1, the host 102 and the NIC 104 are configured to communicate with each other over a Peripheral Component Interconnect (PCI) bus.

In the example of FIG. 1, the NIC 104 is configured to service/perform SSL operations on network packet traffic offloaded from applications running on the host 102 that requires a secured connection with a remote client device over a network (not shown) following certain communication protocols such as TCP/IP protocol. Such network can be but is not limited to, internet, intranet, wide area network (WAN), local area network (LAN), wireless network, Bluetooth, WiFi, mobile communication network, or any other network type. The physical connections of the network and the communication protocols are well known to those of skill in the art.

In some embodiments, the NIC 104 and a plurality of software components running on it are configured to provide the ability to terminate TCP/IP stack processing for the secured connection between the host 102 and the remote client device. The NIC 104 and its software components are also configured to run a complete SSL stack on the NIC 104 to provide inline SSL processing for all of the secured connections. In some embodiments, the NIC 104 is also configured to support normal Ethernet connectivity for the host 102, allowing applications 106 running on the host 102 that do not need SSL processing to use the NIC 104 as a normal Ethernet device via network stack 114. Specifically, the NIC 104 is configured to forward all traffic for connections directly from the host 102 to the remote client device over the network without SSL processing.

In some embodiments, the application 106 running on the host 102 that needs to offload its SSL processing to the NIC 104 is first identified. The identified application 106 is then configured to connect to SSL offload service provided by the NIC 104 using a socket family (including one or more sockets) 108 (e.g., AF_SSL) on the host 102, wherein the sockets 108 can be used/invoked by all applications 106 using similar Application Programming Interface (API) syntax as API for normal TCP/IP sockets. This ensures that regular TCP/UDP applications running on the host 102 can readily use the NIC 104 to offload all of its SSL processing with minimal changes. In some embodiments, the new family of sockets 108 may only support a subset of socket APIs that are needed for SSL offload purposes.

In some embodiments, the NIC driver 110 on the host 102 is configured to handle all communication for packet processing between the host 102 and the NIC 104. A socket handling module 112 is configured to run in the kernel of the OS of the host 102 to handle all application traffic using the new socket family 108 and interfaces with the NIC driver 110 to access the SSL inline processing services provided by the NIC 104.

In some embodiments, the plurality of sockets 108 used by all applications 106 that need SSL inline processing features of the NIC 104 are configured to implement all necessary socket family operations including but not limited to read, write and sendfile.

Figure 2:
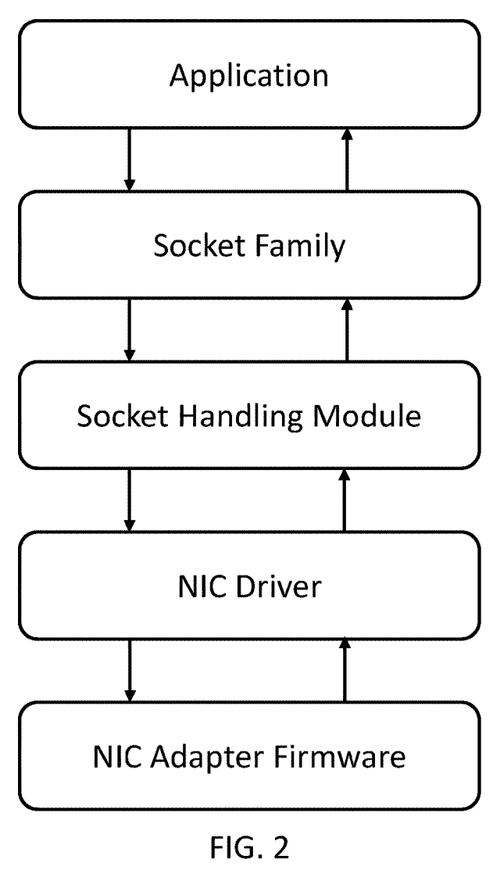
FIG. 2 depicts an example of the flow of data offloaded from an application on the host to the NIC for inline SSL processing in accordance with some embodiments.

With the NIC 104 providing SSL acceleration, all server applications 106 running on the host 102 that need accelerated SSL processing would use the new socket family 108 to establish SSL connections with their remote clients. Since the majority of the traffic to be serviced in the use-case requires the applications 106 to be running on an x86 server, the family of sockets 108 are optimized for server applications. Client applications on the host 102 that need to communicate with remote server using normal TCP/IP or SSL may use the existing OpenSSL and Linux TCP/IP stack and bypass the offload capabilities of the NIC 104 as the SSL accelerator (although the client applications can still use the NIC 104 as the network interface to connect to the network). FIG. 2 depicts an example of the flow of data offloaded from the application on the host 102 to the NIC 104 for inline SSL processing through the family of sockets 108, socket handling module 112, and the NIC driver 110 on the host side and the NIC driver firmware 116 on the NIC 104. The packet data received from the remote client device over the network is provided back to the application 102 after inline SSL processing in the reversed order as discussed in details below.

In the example of FIG. 1, the socket family 108 is configured to bypass the network stack 114 of the OS of the host 102 and route all data traffic/packets through the network socket handling module 112. For data transmission, this kernel-based socket handling module 112 is configured to accept data from the family of sockets 108 and utilize the NIC driver 110 to send the data packets to the SSL proxy engine 118 running on the NIC 104 for inline SSL processing. The socket handling module 112 is configured to packetize the data and to include relevant information about the data packets and its context that would be used by the SSL proxy engine 118 to perform the required SSL processing on the data and send it out over the network. In some embodiments, the NIC driver 110 is configured to utilize one or more PCI input rings (not shown) to transfer the data to the NIC 104 over the PCI bus.

In the example of FIG. 1, the NIC driver 110 on the host 102 is configured to manage various NIC services and/or resources including but not limited to the PCI input and output rings, direct memory access (DMA) and interrupt handling. In some embodiments, the NIC driver 110 is registered with the network stack 114 of the host 102 to provide standard NIC functionality to the host 102 so that host applications 106 using the standard TCP/IP sockets are able to use the NIC as yet another Ethernet device in the host 102.

In some embodiments, in addition to the NIC services, the NIC driver 110 is also configured to provide additional hooks into the driver that are used by the network socket handling module 112 to provide the SSL inline offload services, wherein the hooks provide transmit and receive path support for the data flow from applications 106 using the socket family 108. Both the standard traffic and the SSL offloaded traffic through the NIC driver 110 use the same set of NIC input and output rings, wherein the NIC driver 110 is configured to multiplex the two types of traffic through the network stack 114 and the socket handling module 112, respectively, and to communicate with the NIC driver firmware 116 accordingly.

In the example of FIG. 1, the NIC driver firmware 116 on the NIC 104 is configured to provide back-end support for the NIC driver 110 on the host 102 for both standard Ethernet and inline SSL processing services. Here, the NIC driver firmware 116 includes full TCP/IP and SSL termination support within the NIC 104 itself, which is essential for the SSL proxy engine 118 to perform the SSL services/processing operations on behalf of the applications 106 running on the host 102 using the socket family 108.

Figure 3A:
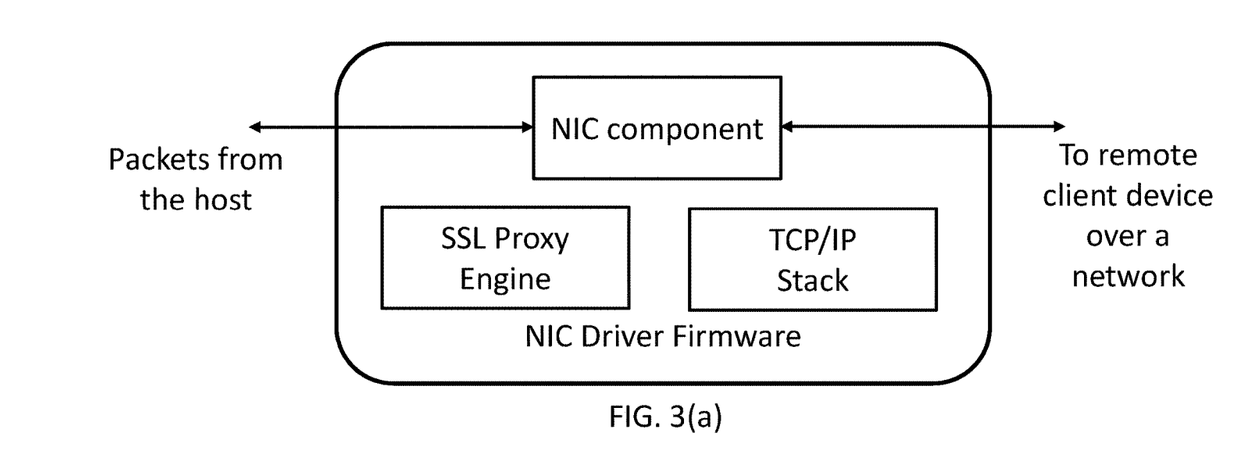
FIGS. 3(a) and (b) depict examples of the NIC driver firmware handling standard and SSL inline offloaded traffic from the host, respectively, in accordance with some embodiments.
Figure 3B:
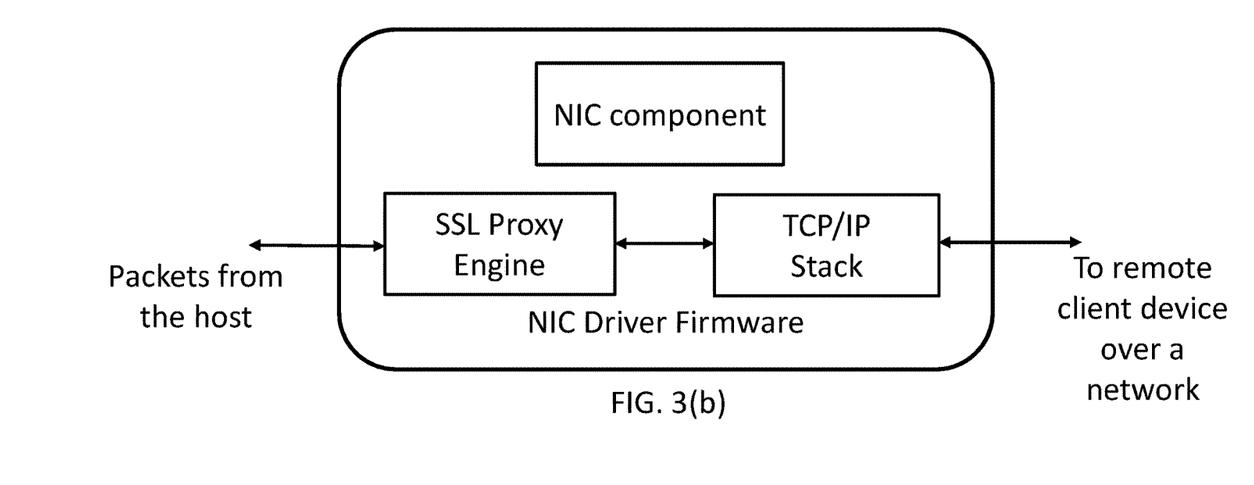

FIGS. 3(a) and (b) depict examples of the NIC driver firmware 116 handling standard and SSL inline offloaded traffic from the host in different ways, respectively. As shown by the example of the data flow in FIG. 3(a), standard/normal network traffic from the applications 106 on the host 102 is unmodified or minimally processed by the NIC firmware component 122 of the NIC 104 and forwarded to the remote client over the network wherein the NIC 104 is used as a network adapter by the host applications 106. The same applies to traffic received from the remote clients over the network and forwarded to the applications 106 on the host 102.

As shown by the example of the data flow in FIG. 3(b), applications 106 in need for inline SSL processing are configured to utilize the sockets 108 to have their data forwarded by the network socket handling module 112 running on the host 102 to the SSL proxy engine 118 running on top of the NIC driver firmware 116. The SSL proxy engine 118 is configured to perform the required SSL processing on the data and uses a separate TCP/IP connecting component 120 on behalf of every data flow using the socket family 108 to send the packets to the remote clients over the network.

Figure 4:
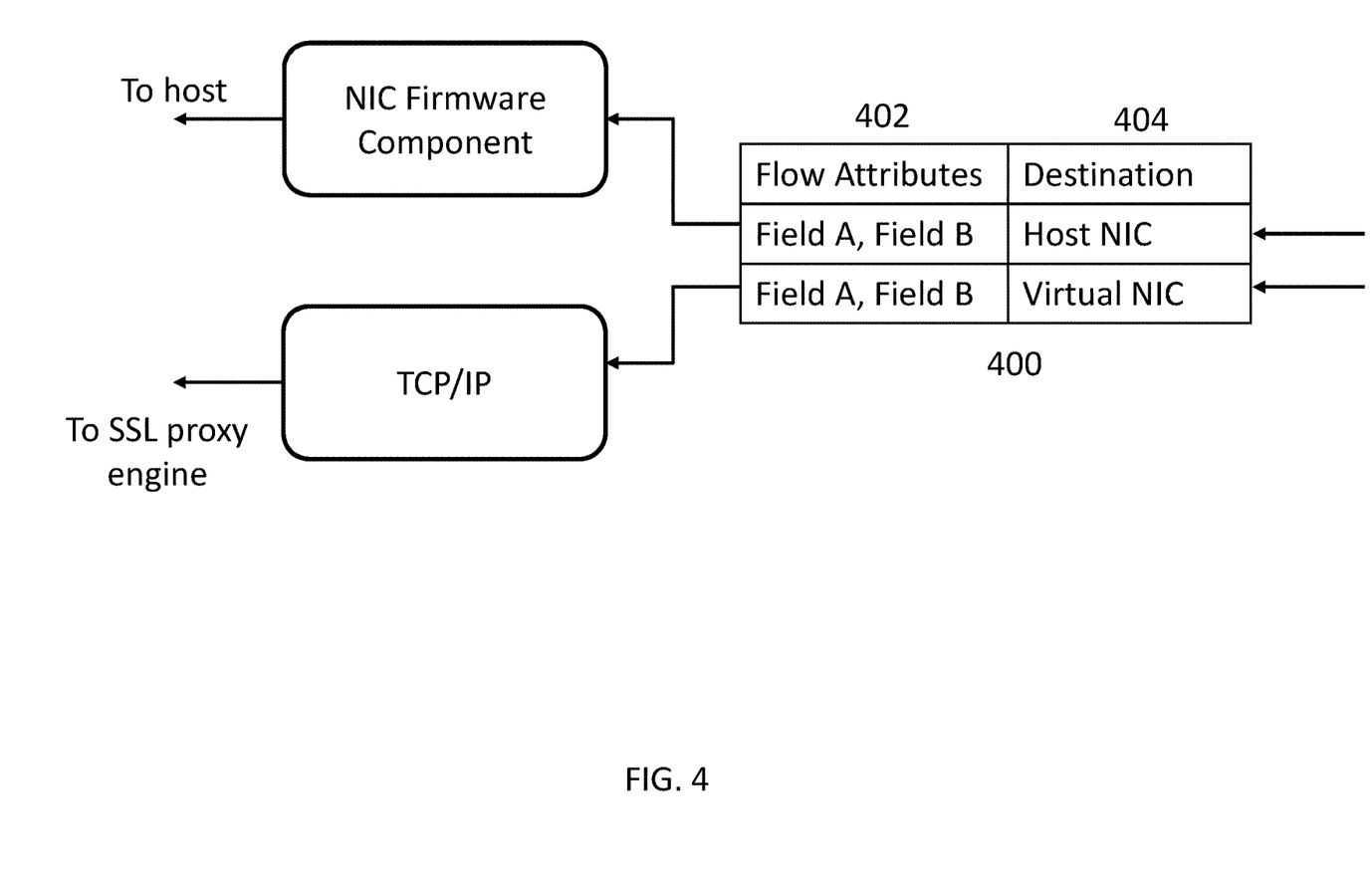
FIG. 4 depicts an example of the flow table used for SSL processing lookup in accordance with some embodiments.

In some embodiments, the NIC 104 is configured to match and tag/identify (encrypted) packets coming in from the remote client device over the network for SSL processing by looking up a flow table maintained in the NIC driver firmware 116. FIG. 4 depicts an example of the flow table 400 used for SSL processing lookup, wherein the flow table 400 includes flow attributes field 402 and destination field 404. For packets/flows that are identified as standard packets, they are forwarded to applications 106 on the host 102 via NIC firmware component 122. For packets that are identified for SSL processing, they are provided to the SSL proxy engine 118 via the TCP/IP connecting component 120 to perform the required SSL processing before the decrypted data packets are being forwarded to the network socket handling module 112 on the host 102. Note that packets destined to the Layer 2 (L2) domain (e.g., address resolution protocol (ARP) used to map IP network addresses to the hardware addresses) are mirrored across to both of the networking stacks on the host 102 and the NIC 104. In some embodiments, the SSL proxy engine 118 is configured to utilize one or more PCI output rings (not shown) to send the data and information about the flow and its context to the socket handling module 112, which then buffers the data in the kernel to service read requests from the server applications 106 via the socket family 108.

For the SSL proxy engine 118 to perform the offloaded SSL processing operations on the packets, the server certificates need to be maintained on the NIC 104. In some embodiments, the network socket handling module 112 running on the host 102 is configured to provide the required mechanism to transfer these server certificates to the NIC driver firmware 116 for the SSL proxy engine 118.

In some embodiments, the SSL proxy engine 118 is a simple application running on top of the NIC driver firmware 116, which is configured to create a simple proxy between the host application 106 and SSL stack (not shown) implemented on the NIC 104. The SSL proxy engine 118 is also configured to manage both establishments and terminations of the secured connection between the host 102 and the remote client device, and to pass appropriate information to the host 102. The SSL proxy engine 118 may also handle data coalescing for better performance if needed.

In some embodiments, the application 106 requiring SSL processing is configured to listen on a specific port on the host 102, wherein information of the port is passed to the SSL proxy engine 118, which creates an appropriate SSL listening socket. Once an SSL handshake is established with the remote client device, a successful notification is sent to the host 102 through, an API call, e.g., accept( ) call and connection related information is also passed to the host 102 at the same time. Selection of a cipher suite for the encryption/decryption can be controlled by the SSL proxy engine 118 via a socket option and certificates required for SSL processing can be placed to the NIC driver firmware 116 or be pushed through another socket option.

In some embodiments, the NIC driver firmware 116 is configured to receive plain packets from the host 102 through APIs of the sockets 108, where message boundaries can be maintained or coalesced if required. Connection information is also sent along to the NIC 104 with these packets/messages. The NIC driver firmware 116 is configured to identify corresponding SSL context of the packets, perform SSL processing, and send these packets to underlying TCP connection, which eventually sends the packets out to the remote client over the network. The NIC driver firmware 116 is also configured to receive encrypted SSL packets from the remote client device over the network via the NIC firmware component 122. After completing TCP termination, SSL processing is performed and packets are decrypted by the SSL proxy engine 118. The decrypted plain packets are then pushed to host 102 with the appropriate connection identification information.

In some embodiments, the NIC firmware component 122 of the NIC 104 runs on a subset of the available processor cores in the NIC 104, wherein the NIC firmware component 122 provides the interface to the external network for the standard Ethernet packets and for the packets processed by the SSL proxy engine 118.

In some embodiments, the SSL proxy engine 118 is implemented as a Linux user space application, which runs on a subset of cores of the NIC 104 that run Linux. The packets coming from the host 102 or from the network are forwarded to the SSL proxy engine 118 by the Ethernet driver (not shown) running on the Linux cores of the NIC 104. The SSL proxy engine 118 is configured to use the TCP/IP stack of the Linux running on the NIC processor cores to establish the proxy connections on behalf of the applications 106 running on the host 102 that require SSL offloading. Note that the SSL proxy engine 118 and the NIC firmware component 122 run on independent cores of the NIC 104 and can co-exist with each other, sharing the NIC hardware resources and any software components required for this co-existence.

Figure 5:
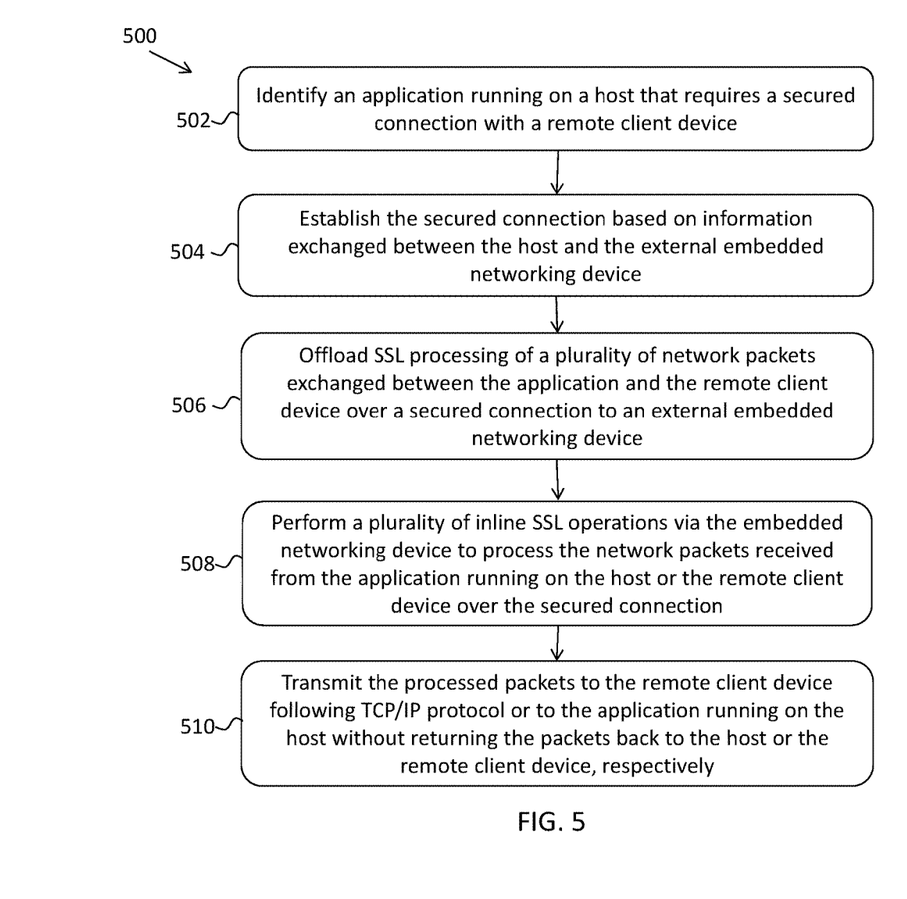
FIG. 5 depicts a flowchart of an example of a process to support offloading of inline SSL processing in accordance with some embodiments.

FIG. 5 depicts a flowchart of an example of a process to support offloading of inline SSL processing. Although this figure depicts functional steps in a particular order for purposes of illustration, the process is not limited to any particular order or arrangement of steps. One skilled in the relevant art will appreciate that the various steps portrayed in this figure could be omitted, rearranged, combined and/or adapted in various ways.

In the example of FIG. 5, the flowchart 500 starts at block 502, where an application running on a host that requires a secured connection with a remote client device is identified. The flowchart 500 continues to block 504, where the secured connection is established based on information exchanged between the host and an external embedded networking device. The flowchart 500 continues to block 506, where SSL processing of a plurality of network packets exchanged between the application and the remote client device over the secured connection are offloaded to the external embedded networking device. The flowchart 500 continues to block 508, where a plurality of inline SSL operations are performed via the embedded networking device to process the network packets received from the application running on the host or the remote client device over the secured connection. The flowchart 500 ends at block 510, where the processed packets are transmitted to the remote client device following TCP/IP protocol or to the application running on the host without returning the packets back to the host or the remote client device, respectively.

The foregoing description of various embodiments of the claimed subject matter has been provided for the purposes of illustration and description. It is not intended to be exhaustive or to limit the claimed subject matter to the precise forms disclosed. Many modifications and variations will be apparent to the practitioner skilled in the art. Embodiments were chosen and described in order to best describe the principles of the invention and its practical application, thereby enabling others skilled in the relevant art to understand the claimed subject matter, the various embodiments and with various modifications that are suited to the particular use contemplated.

What is claimed is:

1. A system to support offloading of inline SSL processing, comprising:
   a host running a plurality of applications and configured to
      identify an application running on the host that requires a secured connection with a remote client device;
      offload Secure Sockets Layer (SSL) processing of a plurality of network packets exchanged between the application and the remote client device over the secured connection to a separate embedded networking device;
   said embedded networking device configured to
      establish the secured connection based on information exchanged between the host and the embedded networking device;
      perform a plurality of inline SSL operations to process the network packets received from the application running on the host or the remote client device over the secured connection;
      transmit the processed packets to the remote client device following TCP/IP protocol or to the application running on the host without returning the packets back to the host or the remote client device, respectively.

2. The system of claim 1, wherein:
   the host is one of an OCTEON, x86, and ARM based devices.

3. The system of claim 1, wherein:
   the embedded networking device is a hardware-based, software-programmable Network Interface Card (NIC).

4. The system of claim 3, wherein:
   the embedded networking device is a multi-core network packet processing engine or a single System-on-Chip (SoC) chip comprising one or more of coprocessors.

5. The system of claim 1, wherein:
   the host and the embedded networking device are configured to communicate with each other over a Peripheral Component Interconnect (PCI) bus.

6. The system of claim 1, wherein:
   the embedded networking device is configured to terminate TCP/IP processing for the secured connection between the host and the remote client device.

7. The system of claim 1, wherein:
   the host is configured to enable the application to offload its SSL processing to the embedded networking device via a socket on the host by invoking an Application Programming Interface (API) having same syntax as a normal TCP/IP socket, wherein the socket is configured to implement all necessary socket operations to enable the application to offload its SSL processing to the embedded networking device.

8. The system of claim 7, wherein:
   the sockets are configured to route data through a kernel-based socket handling module, which is configured to
      packetize the data and include relevant information about the data and its context in the packets;
      send the packets to the embedded networking device for inline SSL processing.

9. The system of claim 1, wherein:
   the embedded networking device is configured to enable an application running on the host that do not need SSL processing to use the embedded networking device as a normal Ethernet device by forwarding all standard traffic from the application directly to the remote client device over the network without SSL processing.

10. The system of claim 9, wherein:
    the host is configured to multiplex both the standard traffic and the offloaded packets for SSL processing through a driver configured to communicate with embedded networking device.

11. The system of claim 1, wherein:
    the embedded networking device is configured to
       match and tag encrypted packets coming in from the remote client device for SSL processing by looking up a flow table;
       perform required SSL processing on the packets tagged for SSL processing before forwarding the processed packets to an application on the host.

12. The system of claim 1, wherein:
    the embedded networking device is configured to establish and terminate the secured connection between the host and the remote client device and to pass appropriate information to the host via a simple proxy between the host and SSL stack implemented on the embedded networking device.

13. The system of claim 1, wherein:
the application requiring SSL processing is configured to listen on a specific port on the host for information to establish the secured connection with the remote client device.

14. A method to support offloading of inline SSL processing, comprising:
identifying an application running on a host that requires a secured connection with a remote client device;
establishing the secured connection based on information exchanged between the host and a separate embedded networking device;
offloading Secure Sockets Layer (SSL) processing of a plurality of network packets exchanged between the application and the remote client device over a secured connection to the embedded networking device;
perform a plurality of inline SSL operations via the embedded networking device to process the network packets received from the application running on the host or the remote client device over the secured connection;
transmitting the processed packets to the remote client device following TCP/IP protocol or to the application running on the host without returning the packets back to the host or the remote client device, respectively.

15. The method of claim 14, wherein:
the embedded networking device is a hardware-based, software-programmable Network Interface Card (NIC).

16. The method of claim 14, wherein:
the host and the embedded networking device are configured to communicate with each other over a Peripheral Component Interconnect (PCI) bus.

17. The method of claim 14, further comprising:
terminating TCP/IP processing for the secured connection between the host and the remote client device.

18. The method of claim 14, further comprising:
enabling the application to offload its SSL processing to the embedded networking device via a socket on the host by invoking an Application Programming Interface (API) having same syntax as a normal TCP/IP socket, wherein the socket is configured to implement all necessary socket operations to enable the application to offload its SSL processing to the embedded networking device.

19. The method of claim 18, further comprising:
routing data through a kernel-based socket handling module, which is configured to
packetize the data and include relevant information about the data and its context in the packets;
send the packets to the embedded networking device for inline SSL processing.

20. The method of claim 14, further comprising:
enabling an application running on the host that do not need SSL processing to use the embedded networking device as a normal Ethernet device by forwarding all standard traffic from the application directly to the remote client device over the network without SSL processing.

21. The method of claim 20, further comprising:
multiplexing both the standard traffic and the offloaded packets for SSL processing through a driver configured to communicate with embedded networking device.

22. The method of claim 14, further comprising:
matching and tagging encrypted packets coming in from the remote client device for SSL processing by looking up a flow table;
performing required SSL processing on the packets tagged for SSL processing before forwarding the processed packets to an application on the host.

23. The method of claim 14, further comprising:
establishing and terminating the secured connection between the host and the remote client device and to pass appropriate information to the host via a simple proxy between the host and SSL stack implemented on the embedded networking device.

24. The method of claim 14, further comprising:
listening on a specific port on the host for information to establish the secured connection between the host and the remote client device.

* * * * *

UNITED STATES PATENT AND TRADEMARK OFFICE
CERTIFICATE OF CORRECTION

PATENT NO.        : 10,095,558 B2
APPLICATION NO.   : 15/152164
DATED             : October 9, 2018
INVENTOR(S)       : Ram Kumar Manapragada et al.

Page 1 of 1

It is certified that error appears in the above-identified patent and that said Letters Patent is hereby corrected as shown below:

In the Claims

Column 8, Line 43, delete "do" after "running on the host that", and insert --does-- therefore; and
Column 10, Line 14, delete "do" after "running on the host that", and insert --does-- therefore.

Signed and Sealed this
Eleventh Day of December, 2018

Andrei Iancu
*Director of the United States Patent and Trademark Office*